Aug. 11, 1953  W. T. TANKING, JR  2,648,128
CAN OPENER
Filed July 19, 1951
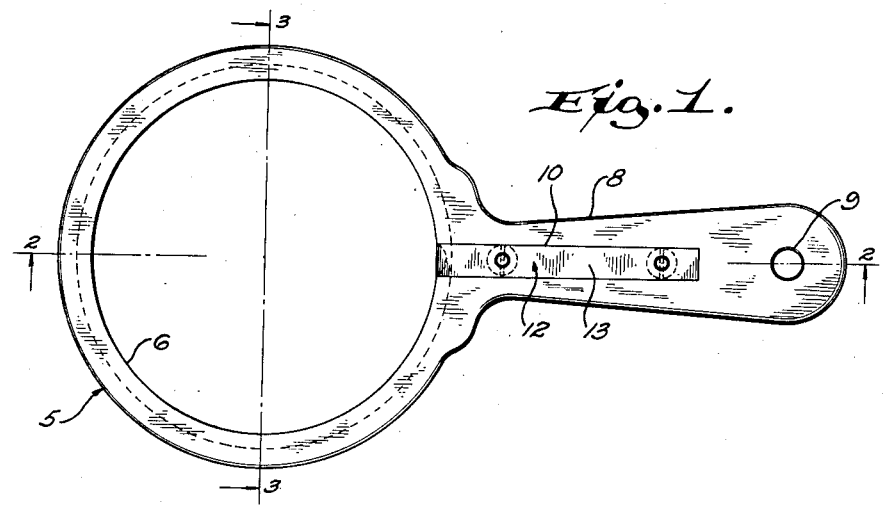
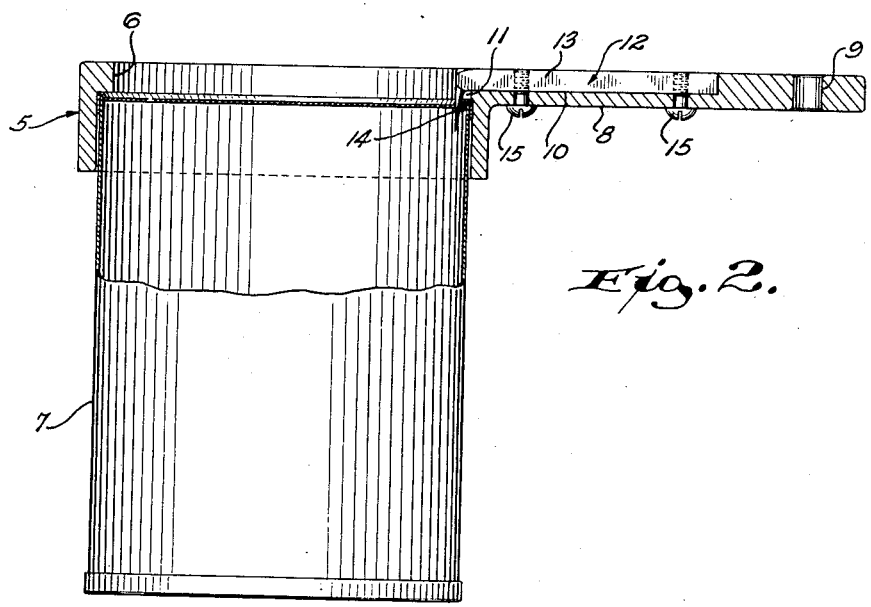
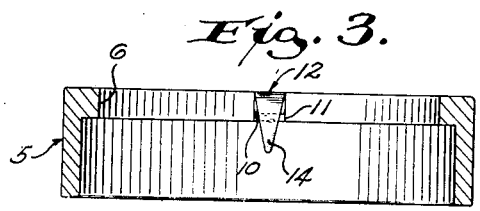
INVENTOR.
William T. Tanking Jr.,
BY
Morsell + Morsell
ATTORNEYS.

Patented Aug. 11, 1953

2,648,128

UNITED STATES PATENT OFFICE 2,648,128

CAN OPENER

William T. Tanking, Jr., Racine, Wis.

Application July 19, 1951, Serial No. 237,598

4 Claims. (Cl. 30—17)

This invention relates to improvements in can openers.

A number of can openers have been developed in the past, and the most popular of these depend for their operation upon coaction with one of the rather pronounced peripheral beads found on the ends of most cans other than the type used for packaging milk. Heretofore, there has not been a satisfactory opener for cans of the latter type, which do not have a pronounced peripheral bead at each end.

The usual method of removing milk from cans has been to use a pointed instrument to form a pair of diametrically oppositely disposed relatively small holes in an end wall of a can adjacent the periphery. Certain can manufacturers provide indentations in the can end walls for locating such holes. The milk is then poured from the can out of one of said holes, the other hole serving as an air vent. This type of opening procedure is unsatisfactory for a number of reasons. First of all it is unsanitary and wasteful if all of the milk is not removed from the can immediately after opening. If the milk is used from the can intermittently, it dries in the holes and clogs the same, thereby requiring removal of the dried milk in order to permit further pouring. Additionally, certain amounts of the milk dry on the inner side and end wall surfaces of the can. The two hole method of opening milk cans is unsatisfactory even in cases where all of the milk is removed from the can immediately upon opening, such as when the milk is used for making infants' formula and the like. In such a case the removal of the milk from the can is tedious because the flow of milk from the can is limited by the small size of the pouring hole.

With the above in mind it is the general object of the present invention to provide an efficient can opener which is particularly well adapted for use in opening cans of the type in which milk is packaged.

A further object of the invention is to provide an improved can opener, the operation of which does not depend upon coaction with a particular type of peripheral bead on the can.

A further object of the invention is to provide an improved can opener having a cutting blade which is so carried thereby that the hands of the user are shielded from the blade and there is no danger of injurious contact therewith.

A further object of the invention is to provide an improved can opener of the class described having an integral operating handle and having a cutting knife formed with an elongated portion which is embedded longitudinally in a substantial portion of the handle to reinforce the same.

A further object of the invention is to provide a can opener of the class described wherein the cutter is removable to permit sharpening thereof, but is firmly fixed when in operative position, in such a manner that repeated use does not tend to dislodge the same.

A further object of the invention is to provide an improved can opener of the class described which is strong and durable, easily operated, and which is otherwise well adapted for the purposes described.

With the above and other objects in view, the invention consists of the improved can opener and all of its parts and combinations, as set forth in the claims, and all equivalents thereof.

In the drawing accompanying and forming a part of this specification in which is shown one complete embodiment of the preferred form of the invention, and in which like characters of reference indicate the same parts in all of the views:

Fig. 1 is a plan view of the improved can opener;

Fig. 2 is a longitudinal vertical sectional view of the can opener taken along the lines 2—2 of Fig. 1 and showing the can opener in operative position on a can; and Fig. 3 is a transverse vertical sectional view taken along the line 3—3 of Fig. 1.

Referring more particularly to the drawing, the numeral 5 indicates a tubular cylindrical body formed at one end with a radially inwardly projecting annular flange 6. The inner diameter of the body 5 is of a size suitable to coaxially and slidably receive therein a can 7, as shown in Fig. 2. The annular flange 6 is adapted to rest on the upper end of the can 7 when the opener is in operative position. A handle 8 projects radially outwardly from the body 5, with its upper surface substantially flush with the upper surface of the body 5 and flange 6. The handle 8 may be formed adjacent its outer end with an aperture 9.

The handle 8 has formed in its upper surface an elongated rectangular groove 10 which also preferably extends radially with respect to the body 5. The groove 10 extends into the body 5 and communicates with a cutaway portion 11 of equal width in the flange 6. An L-shaped cutter 12 is formed with an elongated rectangular portion 13 which is of a size to snugly fit in the groove 10. The inner end of the cutter 12 is formed with a downwardly projecting generally triangular blade 14. The inner surface of the blade 14 is preferably flat, whereas the outer surface of said blade is preferably conical, as shown in Fig. 2. The blade 14 is spaced inwardly from the inner surface of the body 5 and has both marginal edges sharpened. The cutter 12 is held in operative position by a pair of screws 15 which project through suitable apertures in the handle 8 and threadedly engage said cutter to firmly hold the same in operative position in the groove 10.

In the use of the improved can opener, it is only necessary to place the opener on a can in the manner shown in Fig. 2, pressing downwardly to cause the blade 14 to penetrate the top of the can until the shoulder 6 rests on the upper margin of the can. Then, grasping the can in one hand and the handle 8 in the other, the body 5 is rotated in either direction axially of and relative to the can. As this is done, the blade 14 forms an arcuate concentric slit in the end wall of the can adjacent the margin thereof, said slit being preferably slightly less than 360 degrees in extent. Upon removal of the opener from the can, the disk cut from the end wall of the can by the formation of the arcuate slit is folded upwardly, and the contents of the can are poured into a suitable receptacle. All of the milk may be thus removed from the can in an expeditious manner without any opportunity for the milk to become dried onto any parts of the interior of the can.

The construction of the improved opener is such that the hands of the user are always shielded from the blade 14, so that there is no danger of injurious contact therewith. The L-shaped cutter, by reason of the elongated portion 13 which is embedded in the handle 8, forms a substantial reinforcement for said handle, not only through the groove 10, but also through the screws 15. The screws 15 permit the cutter 12 to be removed from the groove 10 for sharpening whenever necessary. Normally, however, said screws firmly hold the cutter 12 in operative position and prevent movement of the cutter relative to the body 6 of the opener.

Various changes and modifications may be made without departing from the spirit of the invention and all of such changes are contemplated as may come within the scope of the claims.

What I claim as the invention is:

1. A can opener, comprising: a tubular cylindrical body adapted to coaxially receive an end portion of a can to be opened; shoulder means on said body adapted to engage the end wall of a can received in said body; an elongated handle projecting radially outwardly from said body and having a surface substantially flush with the end of said body adjacent said shoulder means, said handle being formed with an elongated recess in said surface, said recess extending through a portion of said body; and a cutter having an elongated portion positioned in said recess and fixed to said handle, said cutter having a blade portion spaced inwardly from the inner surface of said body and extending in an axial direction toward the opposite end of the body.

2. A can opener, comprising: a tubular cylindrical body adapted to coaxially receive an end portion of a can to be opened; shoulder means on said body adapted to engage the end wall of a can received in said body; an elongated handle projecting radially outwardly from said body and having a surface substantially flush with the end of said body adjacent said shoulder means, said handle being formed with an elongated recess in said surface extending longitudinally of said handle, said recess extending through a portion of said body; and an L-shaped cutter having an elongated portion positioned in said recess and removably fixed to said handle, said cutter having a blade portion spaced inwardly from the inner surface of said body and extending in an axial direction toward the opposite end of the body.

3. A can opener comprising: a tubular cylindrical body adapted to coaxially receive an end portion of a can to be opened; shoulder means on said body adapted to engage the end wall of a can received in said body; an elongated handle projecting radially outwardly from said body adjacent said shoulder means, said handle having an elongated recess extending longitudinally therein which recess also extends through a portion of said tubular body; and a cutter having an elongated portion positioned in said recess and fixed to said handle, said cutter having a blade portion spaced inwardly from the inner surface of said tubular body and extending axially of said body.

4. A can opener comprising: a tubular cylindrical body adapted to coaxially receive an end portion of a can to be opened; shoulder means on said body adapted to engage the end wall of a can received in said body; an elongated handle adjacent said shoulder means projecting radially outwardly from said body and having a top surface, said handle having an elongated recess in said top surface, said recess extending through a portion of said tubular body; and a cutter having an elongated portion positioned in said recess and fixed to said handle, said cutter having a blade portion spaced inwardly from the inner surface of said tubular body and extending axially of said body.

WILLIAM T. TANKING, Jr.

References Cited in the file of this patent

UNITED STATES PATENTS

| Number | Name | Date |
|---|---|---|
| 213,723 | Wilson | Mar. 25, 1879 |
| 1,655,449 | Werner | Jan. 10, 1928 |